UNITED STATES PATENT OFFICE.

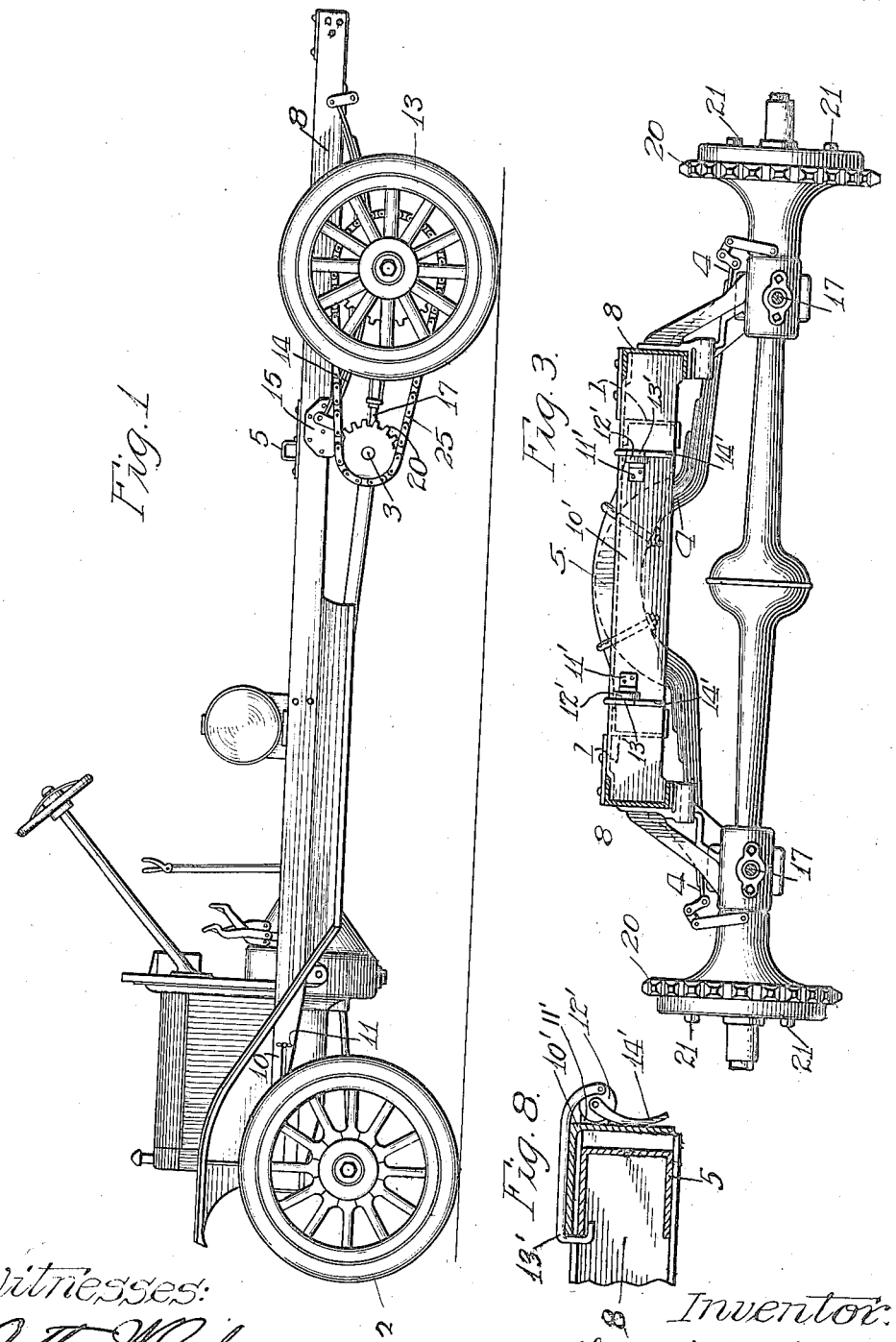

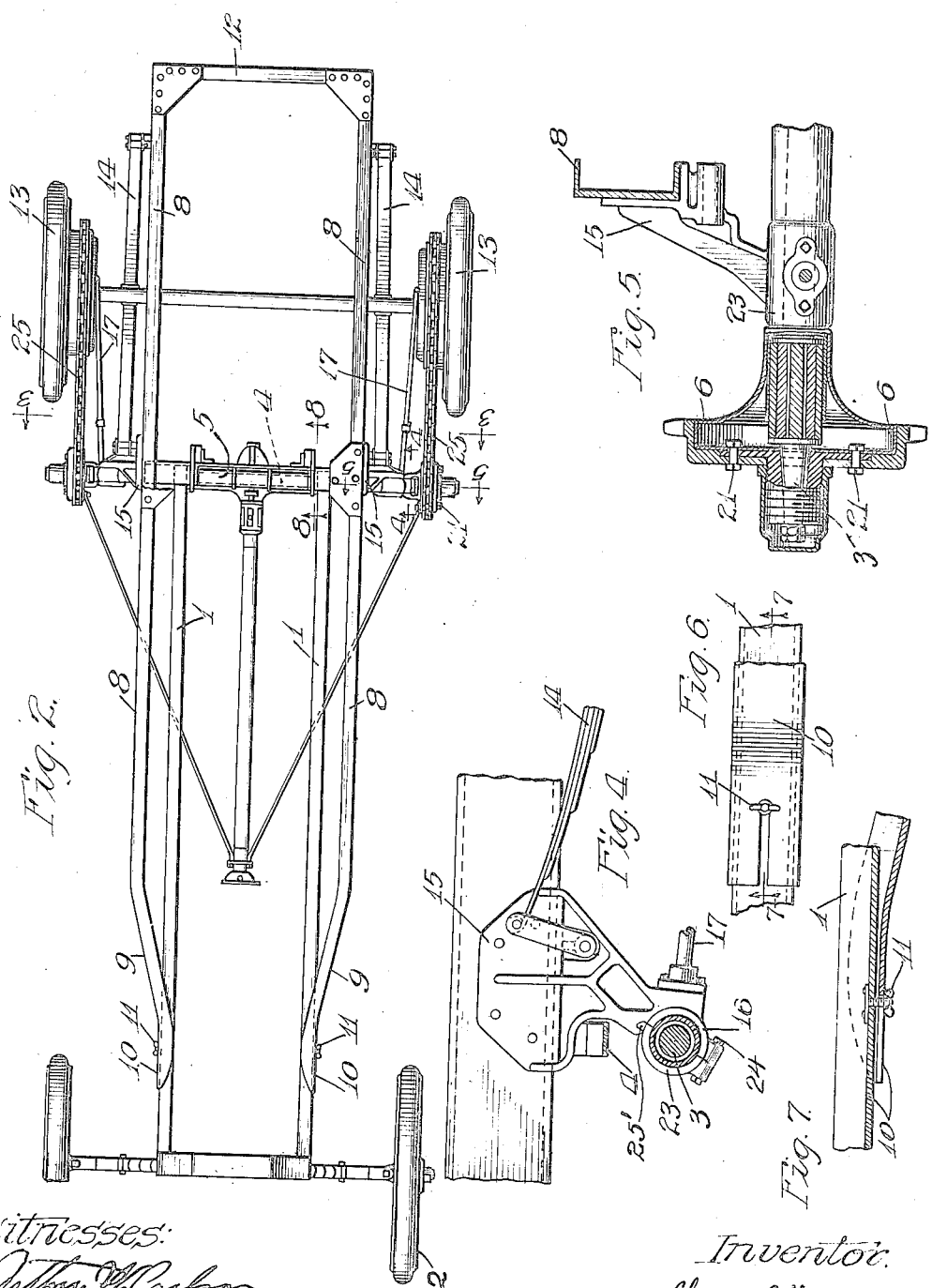

CHARLES D. NORRIS, OF CHICAGO, ILLINOIS.

CONVERTIBLE TRUCK.

1,302,204.                    Specification of Letters Patent.      Patented Apr. 29, 1919.

Application filed January 22, 1916.   Serial No. 73,572.

*To all whom it may concern:*

Be it known that I, CHARLES D. NORRIS, a citizen of the United States, residing at Chicago, in the county of Cook and State of Illinois, have invented certain new and useful Improvements in Convertible Trucks, of which the following is a specification.

This invention relates to self propelled vehicles and particularly to mechanism whereby a pleasure car may be transformed into a haulage truck and vice versa, in a few minutes.

It is the object of the invention to provide a truck frame capable of being directly attached to the frame of a pleasure car (the body having been first removed) and means whereby the resulting truck may be driven from the rear axle of the pleasure car; and to effect these results without mutilating or damaging any of the parts of the pleasure car so that the truck may be at once and easily converted back into a pleasure car again.

It is another object of the invention to provide a convertible truck wherein the rear axle of the car will be rigidly and firmly supported in the truck so as to serve efficiently as a drive shaft therefor without vibrating or jarring loose.

It is a still further object of the invention to provide a convertible truck of the class described where the pleasure car frame at its rear is suspended upon the truck frame and there maintained under tension.

In the drawings:

Figure 1 is an elevation of a truck assembled (without its body).

Fig. 2 is a plan view of the combined parts which make up the frame of the assembled truck.

Fig. 3 is a sectional view on a line 3—3 of Fig. 2.

Fig. 4 is a sectional view on a line 4—4 of Fig. 2.

Fig. 5 is a sectional view on a line 5—5 of Fig. 2.

Fig. 6 is a detailed elevation upon an enlarged scale of method of attaching the truck frame to the auto frame.

Fig. 7 is a sectional view thereof.

Fig. 8 is a detail view, partly in cross section of the quick detachable clamp for the frame connection.

The invention is herein disclosed as applied to a Ford car and while the invention is by no means to be considered as limited to application to such cars, yet the provision of the specific arrangement whereby a Ford car may be instantly converted into a truck is of itself of great utility and advantage and itself constitutes an important improvement.

In the drawings, 1 represents the frame of a Ford car provided with front wheels 2 and with a rear axle 3 carried by rear springs 4 upon which rests the bar 5 connected to the side members 1 of the frame, these parts being of well known and usual construction. The rear axle of the Ford car is provided with rear wheels (not herein shown) which are fitted over brake drums 6. (See Fig. 5.)

I provide a frame to be combined with the frame of the Ford car just described and comprising channeled side members 8 spaced apart farther than the side members 1 of the Ford frame but converging at their front ends as indicated at 9 and terminating in slotted ends 10 (see Figs. 6 and 7), which fit upon the side members 1 of the Ford frame and are adjustably secured by quick releasable clamps 11 as clearly apparent from the drawings. The frame members 8 are connected at their rear by cross channel pieces 12 and the truck frame so formed is provided with rear wheels 13 supported on the springs 14, the rearward ends of which are carried upon the side members 8 and the forward ends connected to brackets 15 bolted to the members 8 as shown. The brackets 15 extend downwardly and outwardly and are provided adjacent to their bottoms with half bearings 16 normally lying an inch or two above the rear axles 3 of the Ford car. Firmly bolted at their ends to the side members 8 of the truck frame is an angle iron 10', upon which is mounted two detachable clamps comprising brackets 11' upon which are pivoted eccentrics 12' to which in turn are connected the hooks 13', the eccentrics 12' being actuated by handles 14'. The angle iron 10' is cut away centrally to permit the member 5 to project upwardly therefrom at the center and is designed to be firmly clamped to the ends of the cross member 5, by means of the hooks 13' and their operating mechanism as clearly seen. This affords a firm connection at this point between the truck frame and the frame of the Ford car.

Distance rods 17 connect the brackets 15 with the axles of the truck wheels as indicated. When the pleasure vehicle is to be converted into a truck, the rear wheels are removed and special sprockets 20 fastened upon the brake drums 6 by bolts 21 (see Fig. 5), there being no manipulation or removal of any other parts of the Ford car than the body and rear wheels. The half bearings 16 are closed by detachable half bearings 23 secured thereto by bolt 24 and by the engagement of the projection 25' thereon with a corresponding recess in the bracket 15. The rear axle of the Ford car may then be quickly raised compressing the rear springs 4 and placed in the bearings 16—23 at either side of the car.

I provide chain drive 25 for the rear wheels 13, details of which are not essential to the invention, any well known form of chain and sprocket being applicable. It is a particularly advantageous feature of the invention that by placing the sprocket over and upon the brake drums a combined drive and brake is effected and the regular brake upon the pleasure car serves without change to operate upon the truck. It is generally unnecessary to provide another brake for the truck, the pleasure car brake being generally sufficient.

In assembling the truck, the body is first removed from the Ford, the truck frame is then run up, the side members 8 secured by means of clamps 11, the rear axles raised and placed in the half bearings 16, the half bearing clamps 23 attached, the clamps 14' manipulated, the rear wheels of the Ford car are removed and the sprockets substituted therefor, and the chains 25 arranged in driving relation with the rear truck wheels 13. With the parts in this position it will be seen that the supplemental or truck frame and the other frame have been connected together firmly but under tension so that there is no rattling or vibration but the parts are tightly united. It is of course obvious that any desired body may be used upon the truck.

I claim—

1. In apparatus of the class described, a pleasure car frame having propelling devices and front wheels thereon, a truck frame having rear wheels thereon, means to attach the front of the truck frame toward the front end of the pleasure car frame and means to thereafter support the rear portion of the pleasure car frame under tension from the truck frame including means for releasably clamping the rear axle of the pleasure car whereby the two frames are combined firmly and rigidly and the rear axle of the pleasure car may be used to drive the truck.

2. In apparatus of the class described, a pleasure car chassis having axles mounted therein, a truck frame, means for connecting the truck frame at its forward end to the pleasure car chassis, means on the truck frame for removably and revolubly holding the pleasure car rear axle, said means comprising a two part clamp rigidly connected with the truck frame, and driving means adapted to be substituted for the rear wheels of the pleasure car for driving the truck substantially as described.

3. In apparatus of the class described, a pleasure car having a frame, a rear axle and rear wheels having integral brake drums and brakes, a supplementary truck frame having rear wheels adapted to be attached to the pleasure car frame, a driving device for driving the truck frame and comprising elements designed to be directly substituted for the rear wheels whereby a combined drive and brake is produced upon the truck.

4. In apparatus of the class described, a pleasure car having a frame, rear axle and wheels, a truck frame adapted to be attached to the pleasure car frame releasable means for securing the rear axle of the pleasure car to the truck frame with the rear spring of the pleasure car positively compressed, and driving means for the truck frame designed to be directly substituted for the rear wheels of the pleasure car.

5. In apparatus of the class described, an axle having a brake drum thereon adapted to carry a rear wheel, a sprocket mounted and rigidly attached to said brake drum.

6. In apparatus of the class described, a Ford automobile frame having a rear axle and rear wheels, a truck frame adapted to be partially superposed upon and attached to the Ford automobile frame, quick detachable means for uniting said frames including means to removably suspend the rear axle of the Ford automobile from the truck frame and meanwhile compress its rear springs, and driving means for the resulting truck chassis comprising means to be directly substituted for the rear wheels of the Ford automobile.

7. In apparatus of the class described, a pleasure car frame having wheels and rear springs thereon, a truck frame having rear wheels thereon adapted to overlie the pleasure car frame and be secured thereto adjacent the forward end thereof, and means whereby said truck frame may be secured to the rear of the pleasure car frame, including means for compressing the rear springs of the pleasure car and for suspending and supporting the rear axle thereof under tension from the truck frame.

8. In a convertible automobile chassis, the combination of an automobile frame comprising side members, a rear axle provided with a tubular casing, an extension frame comprising side members, connected to said automobile frame, a divided bracket rigidly securing said extension frame side members to said tubular casing, an axle provided with traction wheels, springs supporting said axle having one end connected to said brackets and the other end connected to said extension frame side members, and means for driving said traction wheels from said first named axle.

9. The combination of an axle; traction wheels, each having a sprocket wheel on the axle; springs supported by the axle; an auxiliary frame supported by the springs, said frame being provided with brackets in front of the wheels; the sub-frame, rear axle, and transmission gearing of a motor car, the body thereof being removed, the rear part of the frame secured to the front part of the auxiliary frame and the axle supported by the before mentioned brackets; offset sprocket wheels on the said car axle; and chains directly connecting the sprocket wheels on the axle with the sprocket wheels on the traction wheels.

In witness whereof, I hereunto subscribe my name to this specification in the presence of two witnesses.

CHARLES D. NORRIS.

Witnesses:
W. E. LUND,
SEBASTIAN HINTON.